United States Patent
Kim

(10) Patent No.: US 8,594,749 B2
(45) Date of Patent: Nov. 26, 2013

(54) PORTABLE TERMINAL

(75) Inventor: Sung-Han Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1644 days.

(21) Appl. No.: 12/046,721

(22) Filed: Mar. 12, 2008

(65) Prior Publication Data

US 2009/0021896 A1 Jan. 22, 2009

(30) Foreign Application Priority Data

Jul. 19, 2007 (KR) .......................... 10-2007-0072375

(51) Int. Cl.
*H04M 1/00* (2006.01)
*H04B 1/38* (2006.01)

(52) U.S. Cl.
USPC ........................................ 455/575.1; 455/566

(58) Field of Classification Search
USPC .......................................... 455/575.1–575.4
See application file for complete search history.

(56) References Cited

U.S. PATENT DOCUMENTS

| 2006/0025184 A1* | 2/2006 | Cho et al. ................... 455/575.4 |
| 2006/0211460 A1* | 9/2006 | Jeong et al. ................. 455/575.4 |
| 2009/0036177 A1* | 2/2009 | Lee et al. .................... 455/575.3 |

FOREIGN PATENT DOCUMENTS

| KR | 10-2006-0011454 A | 2/2006 |
| KR | 10-2006-0100511 A | 9/2006 |

* cited by examiner

*Primary Examiner* — Michael Faragalla
(74) *Attorney, Agent, or Firm* — Birch, Stewart, Kolasch & Birch, LLP

(57) ABSTRACT

A portable terminal having a first body, a second body moveable with respect to the first body, and a swivel assembly that connects the second body to the first body is provided. The swivel assembly is configured to allow the second body to rotate in a substantially planar motion with respect to the first body between a closed configuration and an open configuration. The swivel assembly includes a spacing unit displacing the second body from the first body while the second body is rotated with respect to the first body.

19 Claims, 14 Drawing Sheets

PORTABLE TERMINAL

CROSS-REFERENCE TO RELATED APPLICATIONS

The present application claims priority to Korean Application No. 10-2007-0072375, filed on Jul. 19, 2007, which is herein expressly incorporated by reference in its entirety.

BACKGROUND OF THE INVENTION

1. Field of the Invention

The present disclosure relates to a portable terminal having a swivel assembly for coupling a second body to a first body and more particularly, to a portable terminal having a swivel assembly that allows the second body to rotate in a substantially planar motion with respect to the first body between a closed configuration and an open configuration.

2. Description of Related Art

A portable terminal is a device which may be configured to perform various functions. Examples of such functions include data and voice communications, capturing images and video via a camera, recording audio, playing music files via a speaker system, and displaying images and video on a display. Some terminals include additional functionality that supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal. For example, a user's interface for allowing a user to easily and conveniently search or select a function is provided. Because the portable terminal is regarded as a personal belonging that represent a user's personality, various designs are being provided.

More recently, swivel type portable terminals having bodies coupled to each other so as to be horizontally rotated are being developed. In one arrangement of the swivel type portable terminal, two bodies are overlapped with each other at the time of a calling. When a user views a moving image or a broadcasting or plays a game, a body having a display can be rotated thus to locate the display in a horizontal direction. Accordingly, the user can view a wider screen. However, the typical configuration of such a swivel type portable terminal has the drawback that the two bodies remain in contact through the rotation of one of the bodies, thereby causing friction between the two bodies and scratching the contacting surfaces of the two bodies.

BRIEF SUMMARY OF THE INVENTION

Therefore, an object of the present disclosure is to provide a swivel type portable terminal capable of minimizing friction or scratch between two bodies by spacing the two bodies from each other when one body is horizontally rotated with respect to another body.

To achieve these and other advantages and in accordance with the purpose of the present invention, as embodied and broadly described herein, there is provided a portable terminal having a first body, a second body moveable with respect to the first body, and a swivel assembly that connects the second body to the first body, the swivel assembly configured to allow the second body to rotate in a substantially planar motion with respect to the first body between a closed configuration and an open configuration. The swivel assembly includes a spacing unit displacing the second body from the first body while the second body is rotated with respect to the first body.

In a further aspect, the swivel assembly may include a base connected to the first body, a shaft passing through the base, and a rotation member fixed to the second body. The rotation member may be coupled to the base so as to be rotatable around the shaft and movable in a first axial direction of the shaft.

According to a further aspect, the spacing unit may include a first protrusion located at the base and a second protrusion located at the rotation member. The second protrusion is configured to lift the rotation member by contacting the first protrusion when the rotation member is rotated.

In a different aspect, the swivel assembly may include a pressing member disposed between the shaft and the rotation member to provide an elastic force to the rotation member in a second axial direction of the shaft opposite the first axial direction.

In yet another aspect, the swivel assembly may include an elastic force unit to provide an elastic force to the rotation member being rotated such that the second body is rotated in a semi-automatic manner.

In still another aspect, the swivel assembly includes a motion preventing member to prevent the second body from moving with respect to the first body in the first axial direction of the shaft when the second body is in the closed configuration and the open configuration.

In another aspect, the swivel assembly is located at one of the right side and the left side of the first body based on a longitudinal axis of the first body.

In accordance with the purpose of the present invention, as embodied and broadly described herein, there is provided a portable terminal having a first body, and a second body foldably connected to the first body, the second body including a connecting body rotatably connected to the first body by a hinge unit and a display body having a display unit that displays information, and a swivel assembly connecting the display body to the connecting body, the swivel assembly being configured to allow the display body to rotate in a substantially planar motion with respect to the connection body between a vertical configuration and horizontal configuration. The swivel assembly includes a spacing unit displacing the display body from the connecting body while the display body is rotated with respect to the connecting body.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Particularly, portable terminals according to the present invention will be explained in more detail with reference to the attached drawings.

Figure 1:
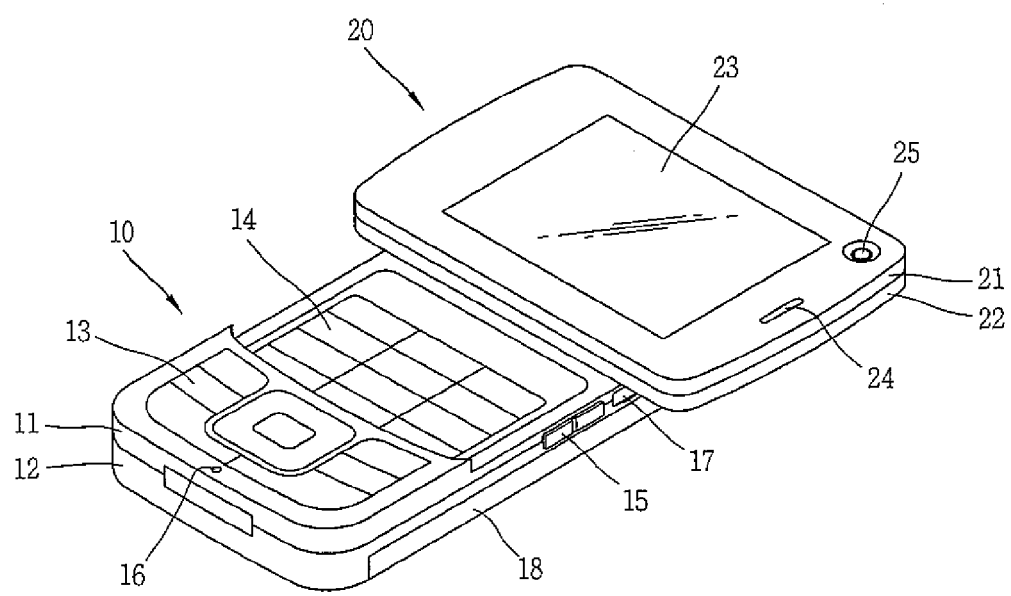
FIG. 1 is a front perspective view of a portable terminal according to a first exemplary embodiment of the present invention.

The portable terminal according to a first exemplary embodiment of the present invention includes a first body 10, and a second body 20 coupled to the first body 10 so as to be horizontally rotated with respect to the first body 10. A state that the second body 20 substantially overlaps with the first body 10 is referred to as a closed configuration or vertical configuration (See FIGS. 3A and 3B). Also, a state that at least one part of the second body 20 is exposed with respect to the first body 10 is referred to as an open configuration or a horizontal configuration, as shown in FIG. 1.

A case, which may also be referred to as a casing, a housing, or a cover, that constitutes an appearance of the firs body 10 is formed by a front case 11 and a rear case 12. Various electronic components (not shown) are mounted in a space formed by the front case 11 and the rear case 12. The cases may be formed from injection molded plastic, or formed using metallic material such as stainless steel (STS) and titanium (Ti).

A first manipulating unit 13 and a second manipulating unit 14 may be disposed at the first body 10, and in particular, at the front case 11. The first and second manipulating units 13 and 14 receive commands to control the operation of the portable terminal according to the first embodiment of the present invention. A third manipulating unit 15, a sound input unit 16, and an interface 17 may be disposed at at least one of the front case 11 and the rear case 12.

The first to third manipulating units 13, 14 and 15 may also be referred to as a manipulating unit. Any type manipulating unit may be adopted as long as it can be manipulated by a user in a tactile manner. The manipulating units 13, 14 and 15 may be implemented as a dome switch, a touch screen, a touch pad for receiving a command or information by a user in a push manner or in a touch manner, a jog wheel or a jog switch, and any combinations thereof. Functionally, the first manipulating unit 13 may serve to input commands such as start, stop, and scroll. The second manipulating unit 14 may serve to input numbers, characters, symbols, or the like. The third manipulating unit 15 may be operated as a hot-key to perform a specific function such as activation of a first image input unit 25 depending on the mode that the phone is being operated in.

The sound input unit 16 for inputting a user's voice, external sound, or the like may be implemented as a microphone, for example.

The interface 17 serves as a passage where the portable terminal of the present invention can perform a data exchange with an external device. For instance, the interface 17 may be implemented as at least one of a connection port connected with an earphone, a short-range communication port, such as an infrared data association (IrDA) port, a BLUETOOTH port, a wireless LAN port, or the like, and a power supply terminal for supplying power to the portable terminal. In addition, the interface unit 17 may be configured as a card socket for receiving an external card such as a subscriber identification module (SIM), a user identity module (UIM), and a memory card for storing information.

A power supply unit 27 for supplying power to the portable terminal is mounted at the rear case 12. The power supply unit 27 may be detachably coupled to the rear case 12 in the form of a chargeable battery.

In the same manner as the first body 10, a case of the second body 20 may be composed of a front case 21 and a rear case 22. A display unit 23, a sound output unit 24, and the first image input unit 25 may be disposed at the second body 20, an in particular, at a front surface of the front case 21. The display unit 23 may be a liquid crystal display (LCD) module for displaying information, an organic light emitting diodes (OLED) module, or the like. The display unit 23 may further include a touch screen that receives information by a user's touch. When the second body 20 is converted to an open configuration from a closed configuration, that is, when the second body 20 is horizontally rotated thus to have a horizontal configuration, the display unit 23 may be configured such that an image is outputted on a screen in correspondence to the horizontal orientation. The sound output unit 24 may be implemented as a receiver or a speaker. The first image input unit 25 may be implemented as a camera module for capturing a still image or a moving image of a user.

Figure 2:
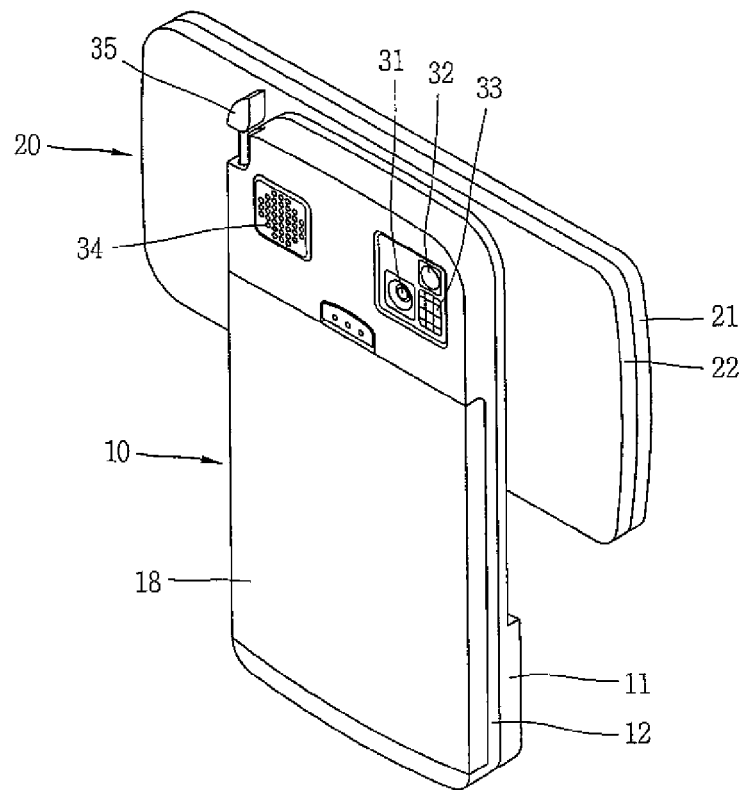
FIG. 2 is a rear perspective view of the portable terminal of FIG. 1.

As shown in FIG. 2, a second image input unit 31 may also be mounted on a rear surface of the rear case 12 of the first body 10. The second image input unit 31 may be a camera facing a direction opposite to the direction faced by the first image input unit 25 of FIG. 1. The second image input unit 31 may have different resolutions from those of the first image input unit 25. For instance, the first image input unit 25 preferably has a low resolution such that a user's captured face is easily transmitted to another party at the time of a video call, or the like. The second image input unit 31 may have a high resolution where the captured object is not intended to be immediately transmitted to another party. A flash 32 and a mirror 33 are additionally disposed near the second image input unit 31. When an object is to be photographed by the second image input unit 31, the flash 32 emits light towards the object. When a user intends to photograph himself or herself by using the second image input unit 31, the user reflects his/her face on the mirror 33.

A second sound output unit 34 may be disposed at the rear case 12 of the first body 10. The second sound output unit 34 may perform a stereo function together with the first sound output unit 24 of FIG. 1, and may also be used for a call in a speaker phone mode.

A broadcasting signal receiving antenna 35 as opposed to than an antenna for receiving a call may be disposed at one side of the rear case 12. The antenna 35 may be installed so as to be drawn out of the second body 10.

Figure 3A:
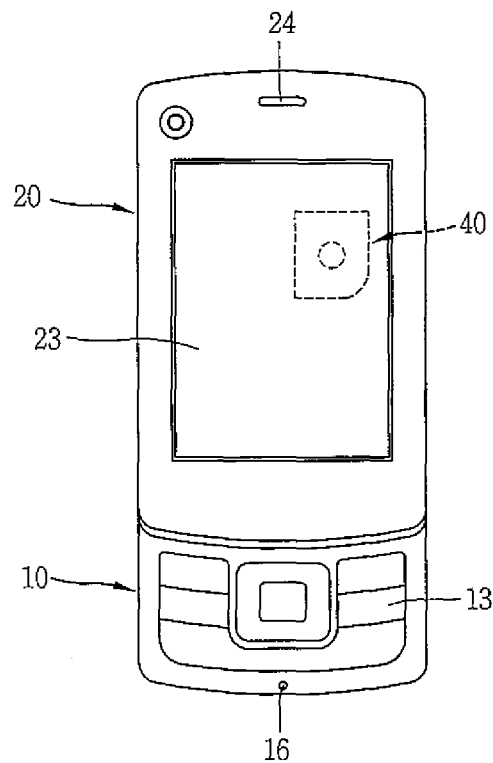
FIGS. 3A to 3F are plan and side views of the portable terminal of FIG. 1 in various degrees of rotation between a closed configuration and an open configuration.
Figure 3B:
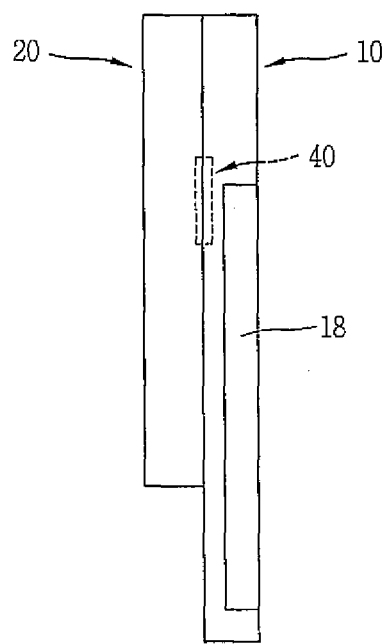
Figure 3C:
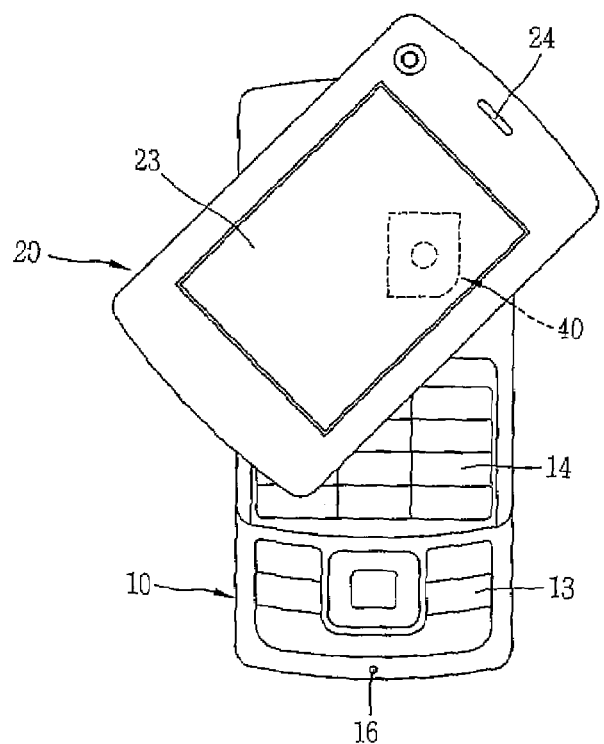
Figure 3D:
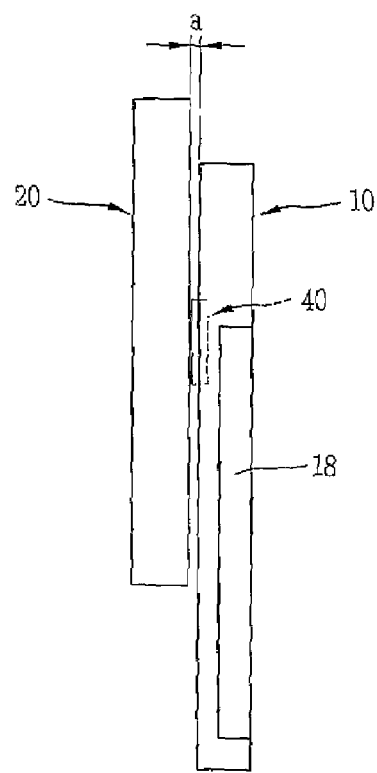
Figure 3E:
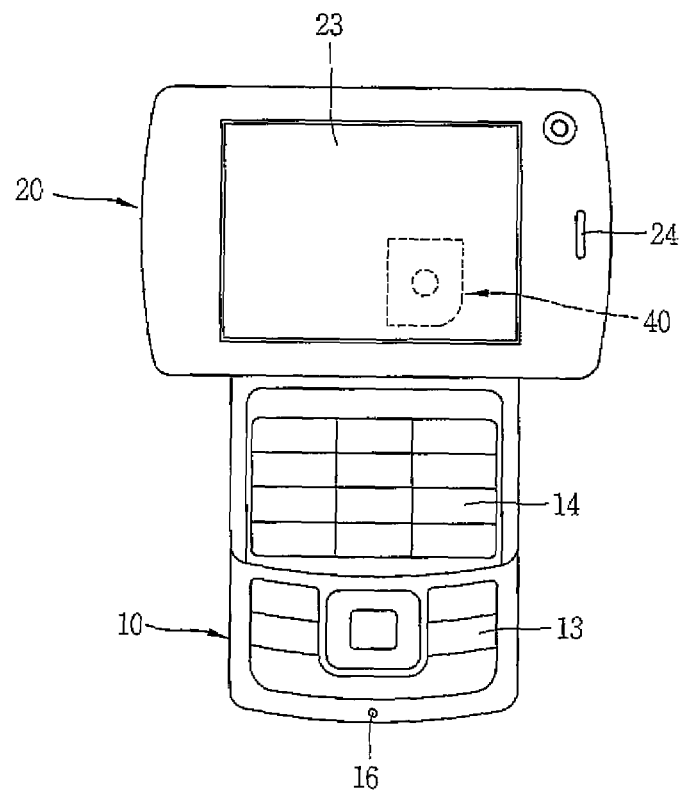
Figure 3F:
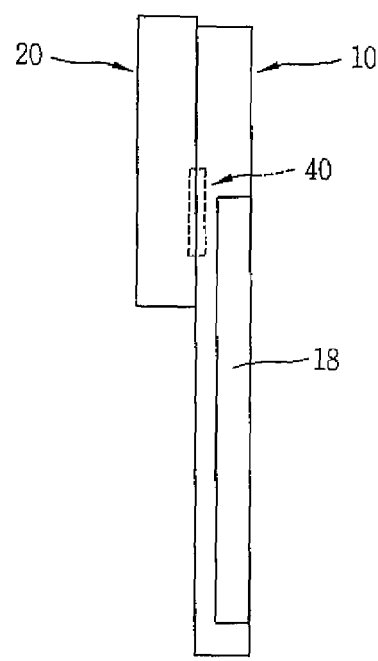

FIGS. 3A to 3F are plan and side views of a portable terminal having a swivel assembly 40 according to a first embodiment of the present invention. More particularly, FIGS. 3A and 3B show a closed configuration of the portable terminal according to the present invention, FIGS. 3C and 3D show a state that the second body 20 is horizontally rotated with respect to the first body 10, and FIGS. 3E and 3F show an open configuration of the portable terminal according to the present invention.

As provided for in the first exemplary embodiment of the present invention, the swivel assembly 40 for coupling the first body 10 and the second body 20 to each other is disposed between the front case 11 of the first body 10 and the rear case 22 of the second body 20. The swivel assembly 40 couples the second body 20 to the first body 10 such that the second body 20 is horizontally rotated with respect to the first body 10. As shown in FIGS. 3A to 3F, the second body 20 is horizontally rotated by the swivel assembly 40 from a closed configuration to an open configuration.

The swivel assembly 40 may be located at a right side or at a left side based on a vertical axis of the first body 10. In a preferred embodiment of the present invention, the swivel assembly 40 is located at a right side based on the vertical axis of the first body 10. Accordingly, in an open configuration of the portable terminal, both ends of the second body 20 are symmetrical about the vertical axis of the first body 10. Also, an area where the second manipulating unit 14 is disposed can be accessed.

The swivel assembly 40 has a spacing unit therein for spacing the second body 20 from the first body 10 when the second body 20 performs a relative rotation with respect to the first body 10. A structure and an operation of the spacing unit will be explained in more detail with reference to FIGS. 5 to 7.

Referring to FIGS. 3A and 3B, when the portable terminal is in a closed configuration, the first body 10 and the second body 20 come in contact with each other. Referring to FIGS. 3C and 3D, when the second body 20 performs a horizontal rotation with respect to the first body 10 in the closed configuration, the first body 10 and the second body 20 are separated by a constant gap (a) by the spacing unit mounted in the swivel assembly 40. Referring to FIGS. 3E and 3F, when the second body 20 is completely rotated to the open configuration of the portable terminal, the first body 10 and the second body 20 come in contact with each other again. Accordingly, when the second body 20 performs a relative rotation with respect to the first body 10, friction or scratching between the first body 10 and the second body 20 can be minimized.

Figure 4:
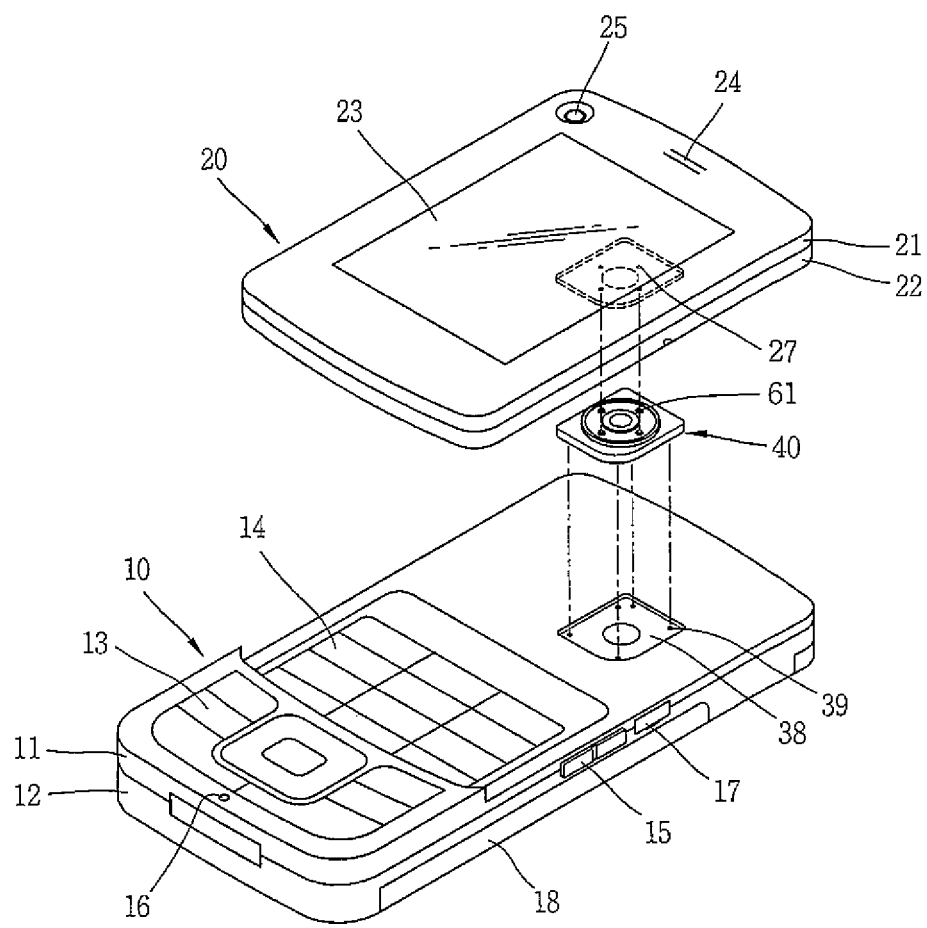
FIG. 4 is an exploded perspective view of portable terminal of FIG. 1 including the swivel assembly according to an exemplary embodiment of the present invention.
Figure 5:
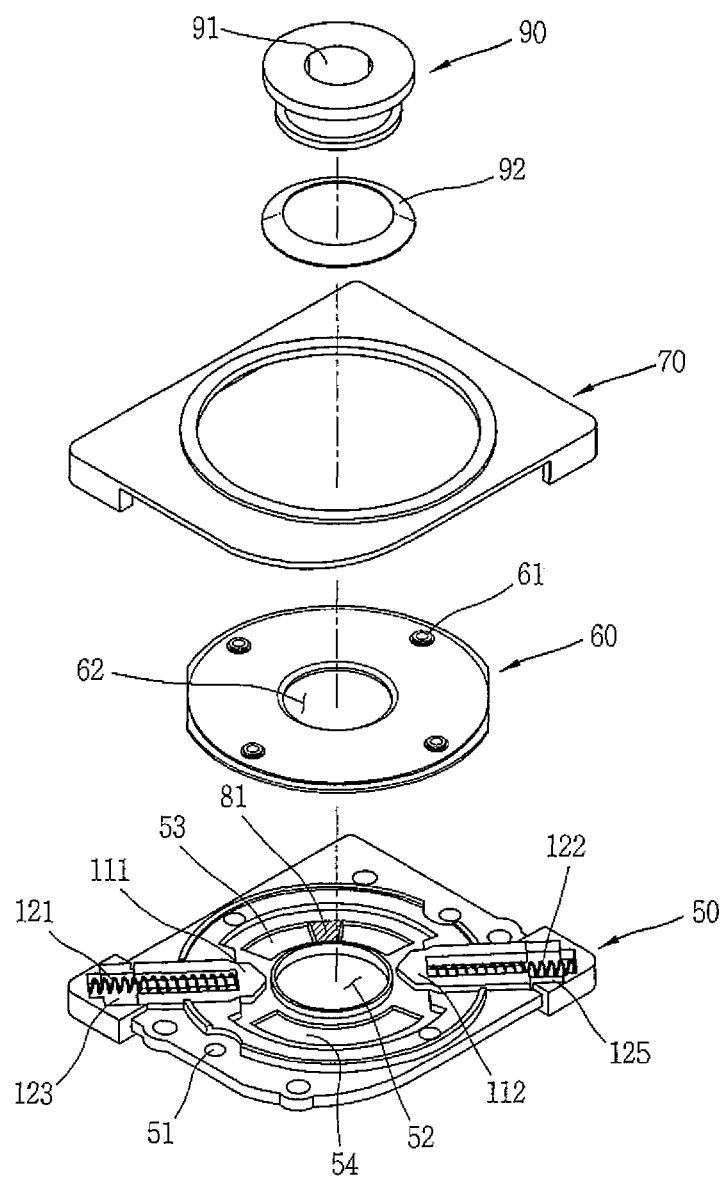
FIG. 5 is an exploded perspective view of the swivel assembly of FIG. 4.
Figure 6:
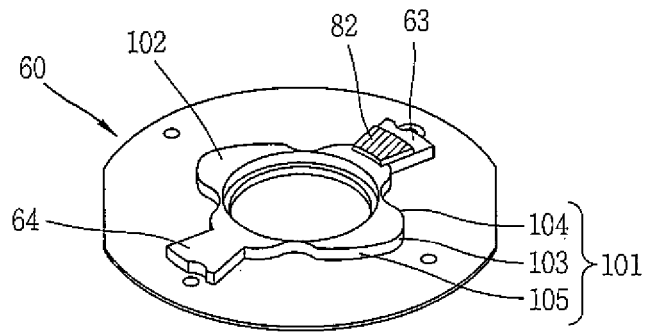
FIG. 6 is a rear perspective view of a rotation member of FIG. 5.

Hereinafter, a detailed construction of the swivel assembly 40 according to the present invention will be explained. FIG. 4 is a perspective view of the swivel assembly 40 according to an exemplary embodiment of the present invention, FIG. 5 is an exploded perspective view of the swivel assembly of FIG. 4, and FIG. 6 is a rear perspective view of a rotation member of FIG. 5.

The swivel assembly 40 may be mounted at a receiving recess 38 formed at the front case 11 of the first body 10. The swivel assembly 40 includes a base 50, a rotation member 60, a cover 70, and a spacing unit 80 (See FIGS. 7A to 7C). The base 50 may be fixed at the receiving recess 38 formed at the front case 11 of the first body 10, and may have a plate shape. Screw holes 51 and 39 to be coupled to each other may be formed at the base 50 and the receiving recess 38, respectively.

The rotation member 60 is fixed to the rear case 22 of the second body 20 and is rotatably coupled to the base 50. The rotation member 60 may be formed in a circular plate shape. Also, screw holes 27 and 61 to be coupled to each other may be formed at the rear case 22 and the rotation member 60, respectively.

The rotation member 60 is coupled to the base 50 so as to be rotatable centering around a rotation shaft 90. Coupling holes 52 and 62 for coupling the rotation shaft 90 and the rotation member 60 are formed at centers of the base 50 and the rotation member 60, respectively. The rotation shaft 90 is inserted into the coupling holes 52 and 62. Both ends of the rotation shaft 90 are formed to have a cross-sectional area larger than that of adjacent portions thereof so as to prevent the base 50 and the rotation member 60 from separating from each other. A through hole 91 may be formed at the center of the rotation shaft 90. The through hole 91 may serve as a passage for passing a flexible printed circuit board (FPCB) that electrically connects the first body 10 and the second body to each other.

The rotation member 60 is mounted at the base 50 so as to be movable with respect to the base 50 in an axial direction of the rotation shaft 90. Accordingly, a height of the rotation shaft 90 between both ends may be larger than the sum of a height of the base 50 and a height of the rotation member 60.

The cover 70 is coupled to the base 50 such that the rotation member 60 is exposed through the cover 70. The cover 70 may protect other components mounted at the base 50.

A guide unit for guiding rotation of the rotation member 60 may be provided at the base 50 and the rotation member 60. The guide unit includes rotation slots 53 and 54 formed at the base 50, and rotation protrusions 63 and 64 formed at the rotation member 60. As shown in FIGS. 5 and 6, the rotation slots 53 and 54 are formed at the base 50 in a ring shape, and the rotation protrusions 63 and 64 are formed on a rear surface of the rotation member 60 and arranged to be inserted into the rotation slots 53 and 54, respectively.

Preferably, the first and second rotation protrusions 63 and 64 are formed at the rotation member, and the first and second rotation slots 53 and 54 are formed at the base, although the guiding unit is not so limited. The first rotation protrusion 63 is inserted into the first rotation slot 53 thus to be moved, and the second rotation protrusion 64 is inserted into the second rotation slot 54 thus to be moved. As the rotation protrusions 63 and 64 move along the rotation slots 53 and 54, the rotation member 60 can rotate more stably with respect to the base 50.

Stoppers 55a, 55b, 55c, and 55d are provided for limiting a rotation angle of the rotation member 60 and may be formed at the rotation slots 53 and 54. The rotation protrusions 63 and 64 are stopped by the stoppers 55a, 55b, 55c, and 55d when being rotated by a certain angle along the rotation slots 53 and 54. The stoppers 55a, 55b, 55c, and 55d may be composed of first and second protruded stoppers 55a and 55b for stopping the rotation member 60 being rotated from a closed configuration to an open configuration at the open configuration, and third and fourth stoppers 55c and 55d for stopping the rotation member 60 being rotated from an open configuration to a closed configuration at the closed configuration.

The spacing unit 80 is configured to move the rotation member 60 in an axial direction of the rotation shaft 90 when the rotation member 60 is rotated, and includes a first protrusion 81 formed at the base 50 and a second protrusion 82 formed at the rotation member 60. The first protrusion 81 may be formed in the first rotation slot 53 of the base 50, and the second protrusion 82 may be formed on the first rotation protrusion 63. The second protrusion 82 is configured to lift the rotation member by contacting the first protrusion 81 when the rotation member 60 is rotated. In this configuration, the second protrusion 82 moves in a contact state with the first protrusion 81, thereby lifting the rotation member 60 by a height of the first protrusion 81 in an axial direction of the rotation shaft 90. The first and second protrusions 81 and 82 may each have an inclination surface so as to move in a contact state with each other. The first protrusion 81 may also be formed at the second rotation slot 54, and the second protrusion 82 may be formed at the second rotation protrusion 64. Alternatively, each of the first protrusion 81 and the second protrusion 82 may be formed in two parts.

Figure 7A:
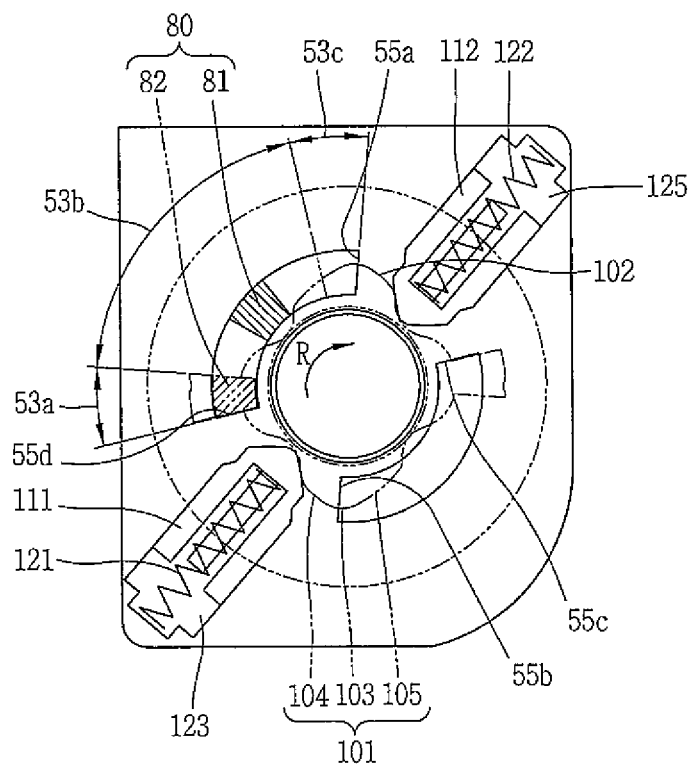
FIGS. 7A to 7C are plan views of the swivel assembly, which show an operation of the swivel assembly of FIG. 4.

The operation of the first and second protrusions 81 and 82 will be explained in more detail with reference to FIGS. 7A to 7C. Here, the 'R' indicates a rotation direction of the rotation member 60. For convenience, the rotation member 60 was not shown, rather only the second protrusion 82 was shown. As an example, the operation of the first rotation slot 53 and the first rotation protrusion 63 will be used to explain the operation of the first and second protrusions 81 and 82. For convenience, the first rotation slot 53 will be referred to as a rotation slot 53, and the first rotation protrusion 63 will be referred to as a rotation protrusion 63.

The rotation slot 53 may include first to third sections 53a, 53b and 53c. As shown in FIG. 7A, the first section 53a is a section where the rotation protrusion 63 is located when the second body 20 is in a closed configuration. In the first section 53a, the first and second protrusions 81 and 82 are disposed so as not interfere with each other, and the second protrusion 82 of the rotation member 60 is disposed so as to contact the rotation slot 53 of the base 60.

Figure 7B:
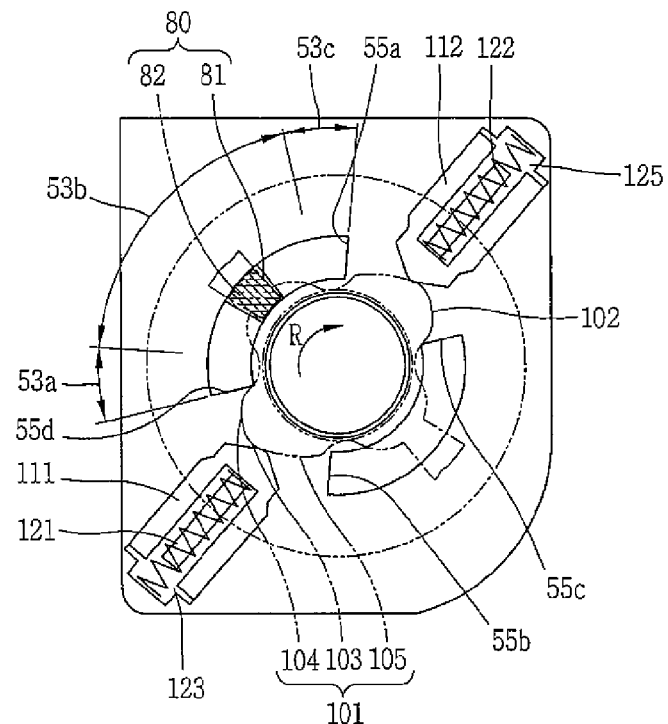

As shown in FIG. 7B, the second section 53b is a section where the rotation protrusion 63 is located when the first protrusion 81 and the second protrusion 61 come in contact with each other. When the second body 20 is horizontally rotated with respect to the first body 10 from a closed configuration, the rotation member 60 fixed to the second body 20 is rotated with respect to the base 50 fixed to the first body 10. In this configuration, the rotation protrusion 63 is moved along the rotation slot 53, and the second protrusion 82 is moved into a contact state with the first protrusion 81. Accordingly, the second protrusion 82 is moved on an upper surface of the first protrusion 81, and as a result, the rotation member 60 is rotated in a lifted state by a height of the first protrusion 81 when compared to the open configuration.

Figure 7C:
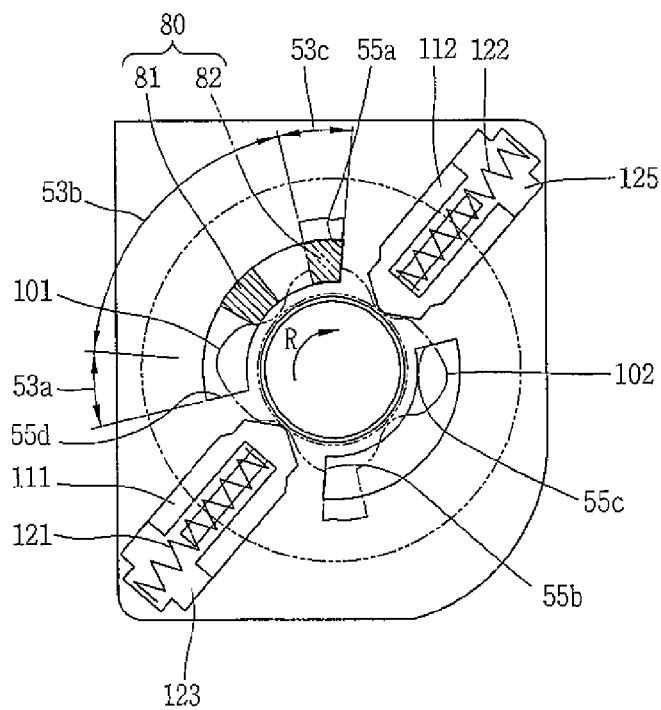

As shown in FIG. 7C, the third section 53c is a section where the rotation protrusion 63 is located when the second body 20 is in an open configuration. In the third section 53c, the second protrusion 82 of the rotation protrusion 63 comes in contact with the rotation slot 53 of the base 50 via the upper surface of the first protrusion 81. Accordingly, the rotation member 60 is disposed on the same position as that in the open configuration. As the rotation protrusion 63 is stopped by the stopper 55a formed at the rotation slot 53, the rotation of the rotation member 60 is stopped.

As noted above, the operation of the first and second protrusions 81 and 82 was explained based on the fact that the rotation member 60 was rotated from a closed configuration to an open configuration. When the rotation member 60 is rotated from an open configuration to a closed configuration, the operation of the first and second protrusions 81 and 82 is the same as the above operation except that the operation order is reversed. Accordingly, a detailed explanation thereof will be omitted.

The swivel unit 40 may further include a pressing member 92 (See FIG. 5) disposed between the rotation shaft 90 and the rotation member 60 for providing an elastic force to the rotation member 60 in an axial direction of the rotation shaft 90. When the rotation protrusion 63 of the rotation member 60 is moved from the second section 53b of the rotation slot 53 to the third section 53c or from the second section 53b to the first section 53a, the pressing member 92 provides an elastic force to the rotation member 60 in an axial direction of the rotation shaft 90. That is, the elastic force is applied in a direction that the second protrusion 82 comes in contact with the rotation slot 53 of the base 50. As the pressing member 92, a spring washer, a spring, or the like may be used.

The swivel unit 40 may further include an elastic force unit for providing an elastic force to the second body 20 such that the second body 20 is rotated in a semi-automatic manner when the second body 20 is rotated between the closed configuration and the open configuration. As shown in FIGS. 5 to 7C, the elastic force unit may include cam portions 101 and 102 disposed at the rotation member 60, movable members 111 and 112 disposed at the base 50, and springs 121 and 122 disposed between the base 50 and the movable members 111 and 112.

The cam portions 101 and 102 are disposed to be adjacent to the first and second rotation protrusions 63 and 64 at the rotation member 60, and are formed in a circumferential direction of the coupling hole 62. The cam portions 101 and 102 are respectively referred to as first and second cam portions 101 and 102 and are disposed between the rotation protrusions 63 and 64.

The movable members 111 and 112 are disposed in receiving spaces of the base 50 so as to be linearly movable therein, and come in contact with the cam portions 101 and 102. The movable members 111 and 112 are referred to as first and second movable members 111 and 112 contacting the first and second cam portions, respectively.

The springs 121 and 122 are disposed at receiving spaces 123 and 125 of the base 50 so as to support the base 50 and the movable members 111 and 112, thereby elastically pushing the movable members 111 and 112 towards the cam portions 101 and 102. The springs 121 and 122 are referred to as first and second springs 121 and 122 for pushing the first and second movable members 111 and 112, respectively.

The operation of the elastic force providing unit will be explained based on the first cam portion 101, the first movable member 111, and the first spring 121. However, the second cam portion 102, the second movable member 112, and the second spring 122 have the same operation as the first cam portion 101, the first movable member 111, and the first spring 121.

The first cam portion 101 may be configured to have a first cam surface 104 and a second cam surface 105 based on a dead point 103. When the second body 20 is rotated with respect to the first body 10 from a closed configuration to an open configuration, the rotation member 60 is rotated in a state that the first cam surface 104 of the first cam portion 101 comes in contact with the first movable member 111. Here, since the first movable member 111 provides an elastic force by the first spring 121 to the first cam surface 104, a user has to provide a rotation force to the second body 20 so as to rotate the second body 20.

When the dead point 103 of the first cam portion 101 comes in contact with the first movable member 111 as the rotation member 60 is rotated in a state that the first cam surface 104 comes in contact with the first movable member 111, the first movable member 111 applies a force to the second cam surface 105. Accordingly, the second cam surface 105 is automatically moved with respect to the first movable member 111. More specifically, once the user applies a rotation force to the second body 20 so that the first moveable member 111 just passes the dead point 103 of the first cam portion 101, the second body 20 is automatically rotated with respect to the first body 10 to an open configuration. Likewise, under a state that the second cam surface 105 of the first cam portion 101 comes in contact with the first movable member 111, once the user applies a rotation force to the second body 20 so that the first moveable member 111 just passes the dead point 103 of the first cam portion 101, the second body 20 is automatically rotated with respect to the first body 10 to a closed configuration.

Figure 8:
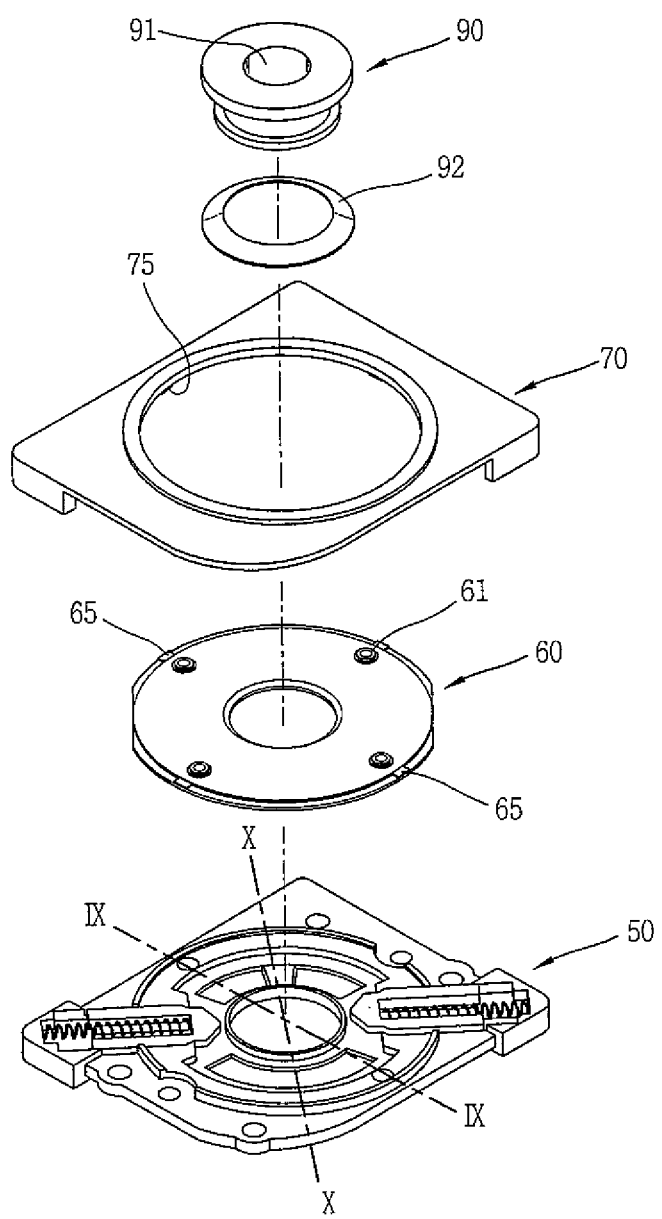
FIG. 8 is an exploded perspective view of a swivel assembly according to another exemplary embodiment of the present invention.
Figure 9:
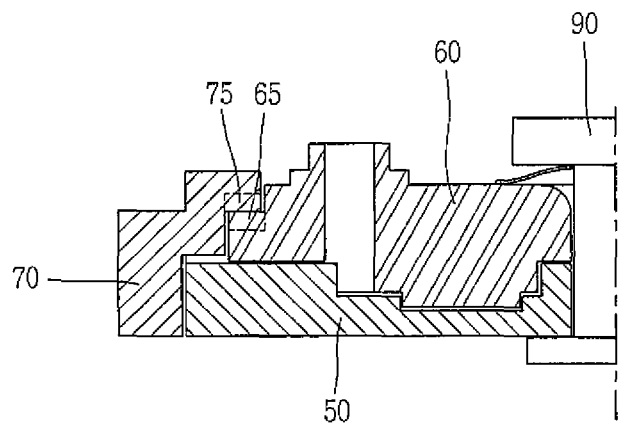
FIG. 9 is a partial sectional view of the assembled swivel assembly of FIG. 8 taken along line IX-IX of the swivel assembly of FIG. 8.
Figure 10:
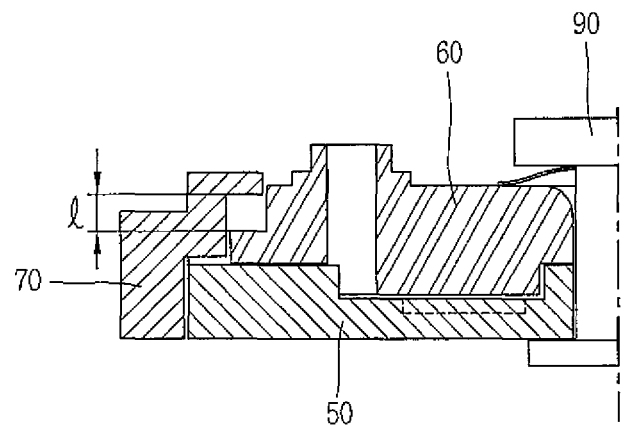
FIG. 10 is a partial sectional view of the assembled swivel assembly of FIG. 8 taken along line X-X of the swivel assembly of FIG. 8.

A second exemplary embodiment of a swivel assembly is shown in FIGS. 8-10. Like the swivel assembly 40 of the first embodiment, the swivel assembly according to the second exemplary embodiment includes a base 50, a rotation member 60, a cover 70, and a spacing unit 80. The swivel assembly of the second embodiment has the same configuration and operation as that of the first embodiment, and the same reference numerals for the same or like parts are used.

The swivel assembly further includes a motion preventing member for preventing the second body 20 from moving with respect to the first body 10 in an axial direction of the rotation shaft when the second body 20 is in the closed configuration or the open configuration. As shown in FIG. 8, the motion preventing member includes a cover protrusion 75 formed at the cover 70 and a rotation protrusion 65 formed at the rotation member 60. Alternatively, a plurality of cover protrusions 75 may be disposed on a rear surface of the cover 70 with a certain interval therebetween. A plurality of rotation protrusions 65 may be disposed on a front surface of the rotation member 60 with a certain interval therebetween so as to correspond to the cover protrusion 75. An interval between the cover protrusions 75 and an interval between the rotation protrusions 65 may be controlled according to an open or closed angle of the second body 20 with respect to the first body 10. Preferably, the open or closed angle of the second body 20 with respect to the first body 10 is 90°, and as such, the cover protrusions 75 and the rotation protrusions 65 are respectively disposed with an angle of 90° therebetween.

When the second body 20 is in an open or closed configuration with respect to the first body 10, as shown in FIG. 9, the cover protrusion 75 and the rotation protrusion 65 come in contact with each other, and thus the rotation member 60 is prevented from moving in an axial direction of the rotation shaft 90. However, as shown in FIG. 10, the rotation member 60 and the cover 70 are formed with a certain interval (l) therebetween at a region where the cover protrusion 75 and the rotation protrusion 65 are not provided. When the rotation member 60 is rotated from a state that the second body 20 is in a closed or open configuration with respect to the first body 10, the contact between the cover protrusion 75 and the rotation protrusion 65 is released, and thus the rotation member 60 can move in an axial direction of the rotation shaft 90.

When the rotation member 60 is being rotated with respect to the base 50, the rotation member 60 can move in an axial direction of the rotation shaft 90 thus to be more smoothly rotated. Also, when the second body 20 is in an open or closed configuration with respect to the first body 10, the second body 20 is stably fixed to the first body 10. Accordingly, the second body 20 is prevented from being rotated with respect to the first body 10.

Figure 11:
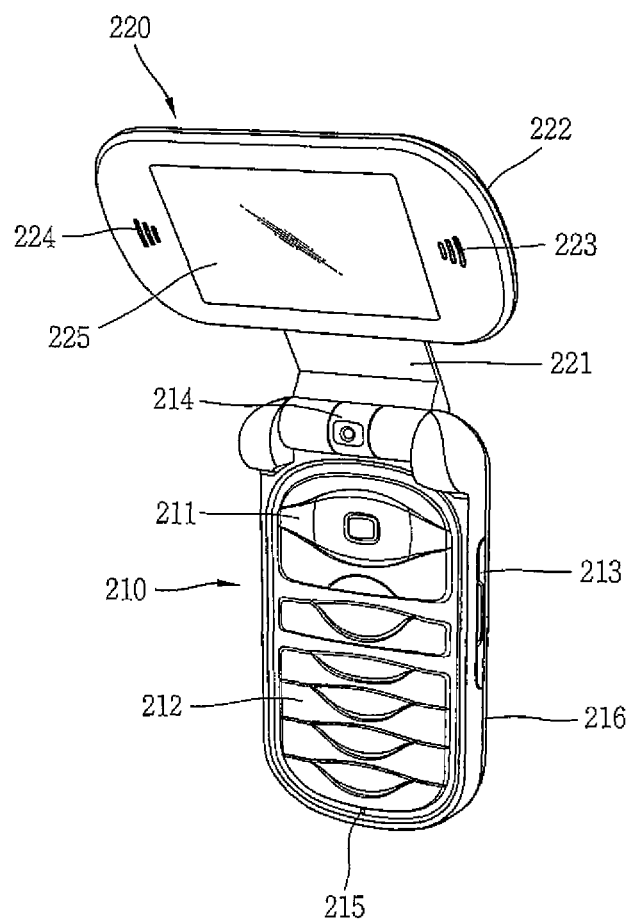
FIG. 11 is a front perspective view showing a portable terminal according to a second exemplary embodiment of the present invention.

The portable terminal according to the first exemplary embodiment with reference to the base 50 being fixed to the first body 10 and the rotation member being fixed to the second body 20. FIG. 11 is a front perspective view showing a portable terminal according to a second exemplary embodiment of the present invention where the portable terminal includes a first body 210 and a second body 220 foldably coupled to the first body 210. First to third manipulating units 211, 212 and 213, a sound input unit 215, a power supply unit 216, and the like may be disposed at the first body 210.

The second body 220 includes a connecting body 221 hinge-coupled to the first body 210, and a display body 222 connected to the connecting body 221 so as to be horizontally rotated. The connecting body 221 may be coupled to the first body 210 by a hinge unit, and the hinge-coupled portion of the connecting body 221 may be provided with an image input unit 214. The image input unit 214 may be disposed so as to be rotatable along a hinge shaft, and may capture an image in various directions.

The display body 222 may be provided with a display 225 for displaying information, a first output unit 223, and a second sound output unit 224. Functionally, the first sound output unit 223 may transmit another party's voice during a call. Also, the second sound output unit 224 may provide a stereo function together with the first sound output unit 223 when the user views a moving image.

In the portable terminal according to the second exemplary embodiment of the present invention, when the second body 220 is in a folded state with respect to the first body 210 to a closed position, the portable terminal may be in a standby mode. However, in a call mode, the second body 220 is rotated with respect to the first body 210 to an open configuration. When a user intends to view a moving image or a broadcasting or intends to play a game, the display body 222 is horizontally rotated with respect to the connecting body 221 to allow the user to view a wider screen. In particular, when the display 225 has a horizontal length longer than a vertical length, this is referred to as a horizontal state and an opposite state thereto is referred to as a vertical state.

Figure 12A:
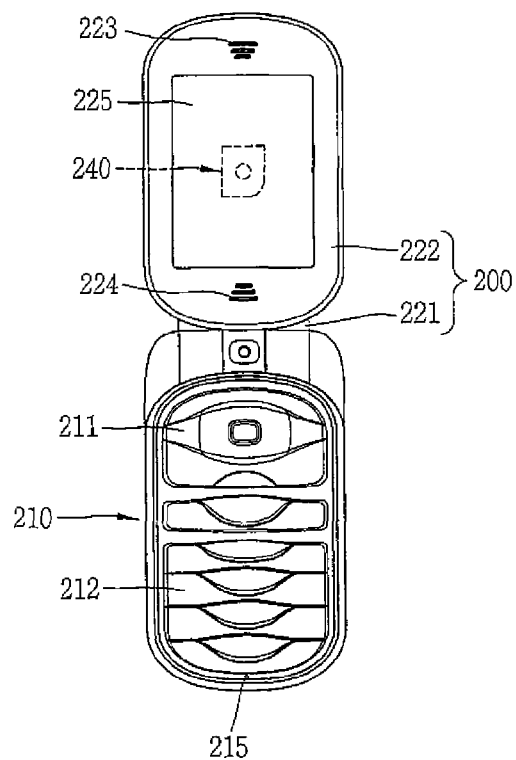
FIGS. 12A to 12F are plan and side views of the portable terminal of FIG. 11 in various degrees of rotation between a vertical configuration and a horizontal configuration.
Figure 12B:
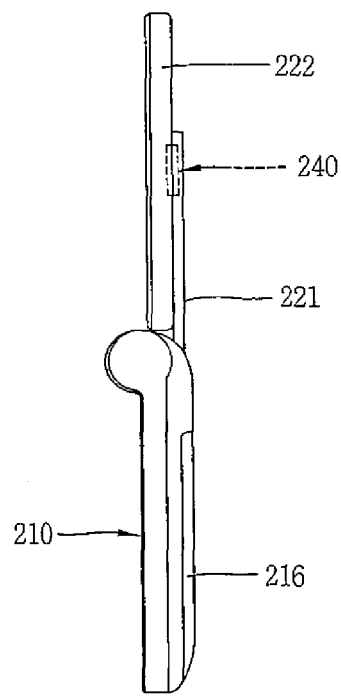
Figure 12C:
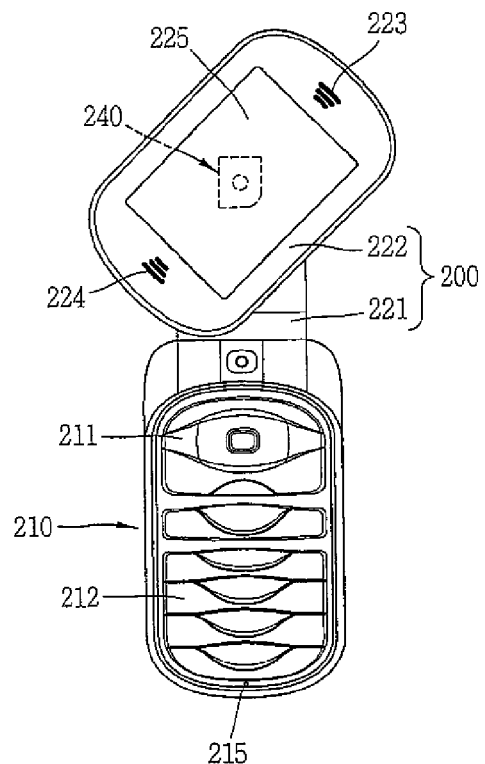
Figure 12D:
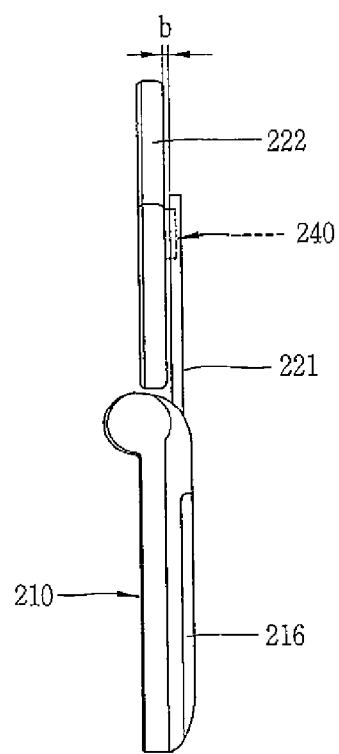
Figure 12E:
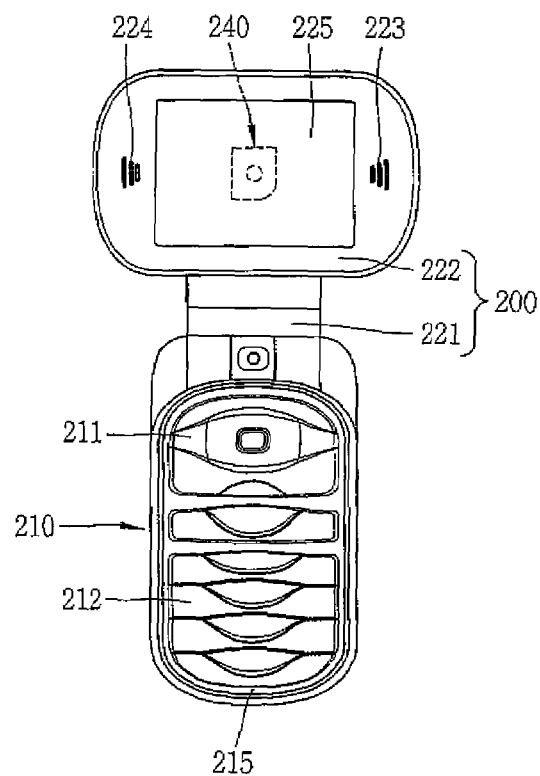
Figure 12F:
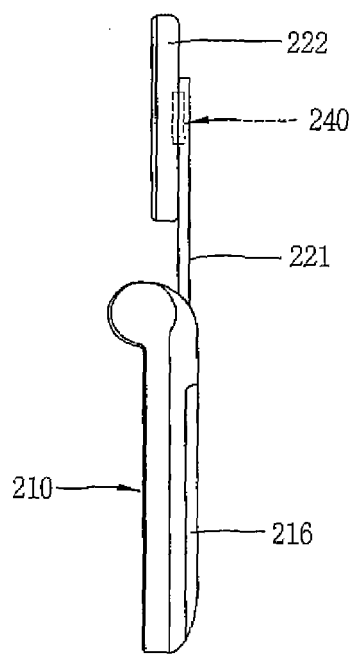

FIGS. 12A to 12F are plan and side views of the portable terminal of FIG. 11. More specifically, FIGS. 12A and 12B show a vertical state of the portable terminal, FIGS. 12C and 12D show a state that the display body 222 is horizontally rotated with respect to the connecting body 221, and FIGS. 12E and 12F show a horizontal state of the portable terminal.

A swivel assembly 240 that couples the display body 222 and the connecting body 221 to each other may be mounted between the display body 222 and the connecting body 221. The swivel assembly 240 serves to couple the display body 222 to the connecting body 221 so the display body 222 is rotatable in a substantially planar motion with respect to the connecting body 221. As shown in FIGS. 12A to 12F, the display body 222 is horizontally rotated with respect to the connecting body 221 from a vertical state to a horizontal state by the swivel assembly 240. The swivel assembly 240 is provided with a spacing unit therein for spacing the display body 222 and the connecting body 221 from each other when the display body 222 is rotated with respect to the connecting body 221.

Referring to FIGS. 12A and 12B, when the portable terminal is in a vertical state, the display body 222 and the connecting body 221 are in contact with each other. Referring to FIGS. 12C and 12D, when the display body 222 is rotated with respect to the connecting body 221, the connecting body 221 and the display body 222 has a certain gap (b) therebetween provided by the spacing unit of the swivel assembly 240. Referring to FIGS. 12E and 12F, when the display body 222 is completely rotated with respect to the connecting body 221 to be in a horizontal state, the connecting body 221 and the display body 222 are in contact with each other again.

The structure and operation of the swivel assembly 240 and the spacing unit of the swivel assembly 240 are same as those of the aforementioned ones, and thus their detailed explanation will be omitted. In addition, while the portable terminal according to the second embodiment was explained with reference to the base being fixed to the connecting body and the rotation member being fixed to the displaying body, this arrangement can be reversed.

As aforementioned, in the portable terminal according to the present invention, the spacing unit for spacing the first and second bodies from each other when the second body is rotated with respect to the first body is provided at the swivel assembly, thereby minimizing friction or scratching between the first and second bodies.

Second, the spacing unit is provided as first and second protrusions, thereby spacing the first and second bodies from each other by a simple structure.

Third, the elastic force unit is disposed at the swivel assembly, thereby assisting in horizontally rotating the second body with respect to the first body more conveniently and simply.

Fourth, the motion preventing member is disposed at the swivel assembly, thereby more smoothly rotating the second body with respect to the first body, and preventing the second body from moving with respect to the first body in an open or closed configuration. Accordingly, a more stable structure of the portable terminal can be implemented.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed:

1. A portable terminal, comprising:
    a first body;
    a second body moveable with respect to the first body; and
    a swivel assembly connecting the second body to the first body, the swivel assembly being configured to allow the second body to rotate in a substantially planar motion with respect to the first body between a closed configuration and an open configuration, the swivel assembly including:
        a spacing unit displacing the second body from the first body while the second body is rotated with respect to the first body;
        a base connected to the first body;
        a shaft passing through the base;
        a rotation member fixed to the second body, the rotation member being coupled to the base so as to be rotatable around the shaft and movable in a first axial direction of the shaft; and
        a guide unit to guide rotation of the rotation member, the guide unit including:
            a rotation slot in the base; and
            a rotation protrusion at the rotation member, the rotation protrusion configured to rotatably move along the rotation slot,
        wherein the swivel assembly is located at one of the right side and the left side of the first body based on a longitudinal axis of the first body such that the second body eccentrically rotates with respect to the longitudinal axis, and
        wherein a rotation axis of the second body is fixed to said one of the right side and the left side of the first body based on the longitudinal axis of the first body such that the rotation axis is prevented from moving with respect to the first body.

2. The portable terminal of claim 1, wherein the spacing unit is located at the base and the rotation member so as to move the rotation member in the first axial direction of the shaft during rotation of the second body.

3. The portable terminal of claim 2, wherein the spacing unit includes:
    a first protrusion located at the base; and
    a second protrusion located at the rotation member, the second protrusion being configured to lift the rotation member by contacting the first protrusion when the rotation member is rotated.

4. The portable terminal of claim 3, wherein the first protrusion is located in the rotation slot and the second protrusion is located at the rotation protrusion.

5. The portable terminal of claim 4, wherein the rotation slot includes:
    a first section where the rotation protrusion is located when the second body is in the closed configuration;
    a second section where the rotation protrusion is located when the first protrusion and the second protrusion come in contact with each other during the rotation of the second body between the closed configuration and the open configuration; and
    a third section where the rotation protrusion is located when the second body is in the open configuration.

6. The portable terminal of claim 1, wherein the rotation slot includes at least one stopper that limits the rotation of the rotation member such that the rotation member is stopped at a certain angle.

7. The portable terminal of claim 1, wherein the swivel assembly includes a pressing member disposed between the shaft and the rotation member to provide an elastic force to the rotation member in a second axial direction of the shaft opposite the first axial direction.

8. The portable terminal of claim 1, wherein the swivel assembly includes an elastic force unit to provide an elastic force to the rotation member being rotated such that the second body is rotated in a semi-automatic manner.

9. The portable terminal of claim 8, wherein the elastic force unit includes:
    a receiving space located in the base;
    a cam portion located at the rotation member, the cam portion extending in a circumferential direction about the shaft;
    a movable member located at the receiving space and contacting the cam portion so as to be linearly movable in the receiving space; and a spring disposed between the base and the movable member to elastically press the movable member towards the cam portion.

10. The portable terminal of claim 1, wherein the swivel assembly includes a motion preventing member to prevent the second body from moving with respect to the first body in the first axial direction of the shaft when the second body is in the closed configuration and the open configuration.

11. The portable terminal of claim 10, wherein the swivel assembly includes a cover mounted at the base, and the motion preventing member includes:
   a cover protrusion formed on a rear surface of the cover; and
   a rotation protrusion formed on a front surface of the rotation member, the rotation protrusion contacting the cover protrusion thereby fixing the rotation member.

12. A portable terminal, comprising:
   a first body;
   a second body foldably connected to the first body, the second body including:
   a connecting body rotatably connected to the first body by a hinge unit; and
   a display body having a display unit that displays information; and
   a swivel assembly connecting the display body to the connecting body, the swivel assembly being configured to allow the display body to rotate in a substantially planar motion with respect to the connecting body between a vertical configuration and a horizontal configuration, the swivel assembly including:
      a spacing unit displacing the display body from the connecting body while the display body is rotated with respect to the connecting body;
      a base fixed to the connecting body;
      a shaft passing through the base;
      a rotation member fixed to the display body, the rotation member being coupled to the base so as to be rotatable around the shaft and movable in a first axial direction of the shaft;
      a cover mounted at the base; and
      a motion preventing member to prevent the display body from moving with respect to the connecting body in the axial direction of the rotation shaft when the display body is in the vertical configuration or the horizontal configuration, the motion preventing member including:
         a cover protrusion formed on a rear surface of the cover; and
         a rotation protrusion formed on a front surface of the rotation member, and contacting the cover protrusion thereby fixing the rotation member,
   wherein the swivel assembly is located at one of the right side and the left side of the connecting body based on a longitudinal axis of the connecting body such that the second body eccentrically rotates with respect to the longitudinal axis, and
   wherein a rotation axis of the display body is fixed to said one of the right side and the left side of the connecting body based on the longitudinal axis of the first body such that the rotation axis is prevented from moving with respect to the connecting body.

13. The portable terminal of claim 12, wherein the spacing unit includes:
   a first protrusion formed at the base; and
   a second protrusion formed at the rotation member, the second protrusion configured to lift the rotation member by contacting the first protrusion when the rotation member is rotated.

14. The portable terminal of claim 13, wherein the swivel assembly includes a guide unit to guide rotation of the rotation member, the guide unit including:
   a rotation slot in the base so as to have a ring shape; and
   a rotation protrusion at the rotation member, the rotation protrusion configured to rotatably move along the rotation slot.

15. The portable terminal of claim 14, wherein the first protrusion is located in the rotation slot, and the second protrusion is located at the rotation protrusion.

16. The portable terminal of claim 12, wherein the swivel assembly includes an elastic force unit to provide an elastic force to the rotation member being rotated such that the display body is rotated in a semi-automatic manner.

17. The portable terminal of claim 16, wherein the elastic force unit includes:
   a receiving space located in the base;
   a cam portion located at the rotation member, the cam portion extending in a circumferential direction about the shaft;
   a movable member located at the receiving space and contacting the cam portion so as to be linearly movable in the receiving space; and
   a spring disposed between the base and the movable member to elastically press the movable member towards the cam portion.

18. The portable terminal of claim 1, wherein the swivel assembly defines a rotational axis about which the second body rotates, the rotational axis being spaced from the longitudinal axis.

19. The portable terminal of claim 18, wherein opposing ends of the second body are symmetrical about the longitudinal axis when the second body is in the open configuration.

* * * * *